Figure 1:
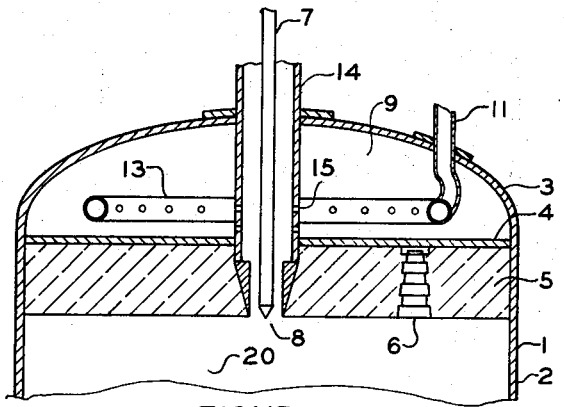

United States Patent [19]

Venable, Jr.

[11] 3,716,340
[45] Feb. 13, 1973

[54] CARBON BLACK REACTOR

[75] Inventor: Charles R. Venable, Jr., Bartlesville, Okla.

[73] Assignee: Phillips Petroleum Company

[22] Filed: Sept. 16, 1970

[21] Appl. No.: 72,637

[52] U.S. Cl. ............... 23/259.5, 431/188, 431/187, 208/48, 208/48 Q, 23/277 R, 431/190
[51] Int. Cl. .............................................. C09c 1/48
[58] Field of Search ............. 23/259.5, 209.4, 209.6; 431/238, 239, 243, 187, 188, 181; 260/679 R

[56] References Cited

UNITED STATES PATENTS

| | | |
|---|---|---|
| 2,877,717 | 3/1959 | Reed ................................... 23/259.5 |
| 3,376,111 | 4/1968 | Stegelmay ............................ 23/209.4 |
| 1,890,188 | 12/1932 | Morrell et al. .................... 23/259.5 X |
| 2,682,450 | 6/1954 | Sweigart et al. ..................... 23/259.5 |
| 2,862,545 | 12/1958 | Snow et al. ...................... 23/259.5 X |
| 2,420,999 | 5/1947 | Ayers .................................. 23/259.5 |

Primary Examiner—James H. Tayman, Jr.
Attorney—Young and Quigg

[57] ABSTRACT

A carbon black reactor employing a support for a suspended arch, the support forming a section between itself and the head of the reactor into which the oxidizing gas is introduced to cool the support.

3 Claims, 3 Drawing Figures

PATENTED FEB 13 1973  3,716,340

INVENTOR.
C. R. VENABLE, JR.

BY

*Young & Grigg*
ATTORNEYS

CARBON BLACK REACTOR

This invention pertains to carbon black apparatus.

In one of its more specific aspects, this invention relates to vertically positioned carbon black reactors particularly suitable for the production of large particle carbon black.

In my application Ser. No. 845,959, filed July 30, 1969, now U.S. Pat. 3,560,164, there was described and claimed a carbon black reactor employing suspended arch construction at its uppermost axial inlet.

The present invention is an improvement over that reactor and is a modification of that suspended arch construction.

According to the present invention, there is provided a carbon black reactor comprised of a chamber closed at one end by a closure member with a support member positioned within the chamber in spaced relation to the closure member; this support member forms an upper substantially closed section between itself and the closure member and a lower reaction section. A refractory arch is suspended from the support member. A conduit introduces a cooling fluid into the closed section with a fluid distributor positioned therein distributing the fluid into contact with the support member. Another conduit conducts the fluid from closed section into the reaction section.

The present invention is a means of improving suspended arch construction of carbon black reactors. It is employable regardless of the configuration of the head which closes the reactor within which the suspended arch is positioned. However, it is particularly suitable for that process which, because of its operating pressure, requires an elipitical or dished head vessel closure but which, because of its operating temperatures, preferably employs a substantially flat suspended arch.

In the employment of the apparatus of this invention in carbon black manufacture, the apparatus of this invention employs air as the coolant of that member acting as the support from which the refractory arch is suspended. Other reactants can be similarly employed, whether gaseous or liquid.

Figure 2:
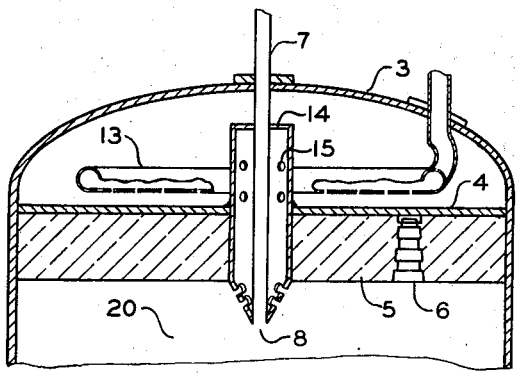
Figure 3:
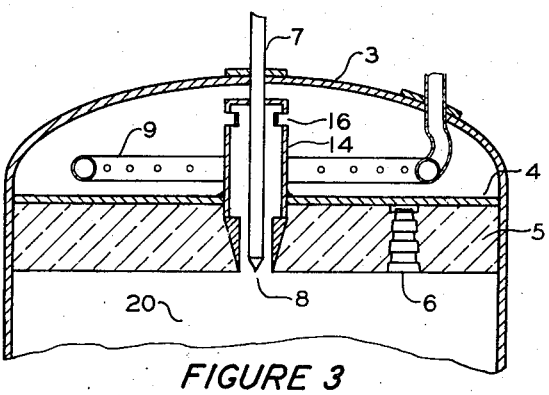

The apparatus of this invention will be more easily understood if explained in conjunction with the attached drawings in which FIG. 1 depicts the apparatus of this invention in elevation; FIG. 2 presents a second embodiment of the upper section of the apparatus of this invention; FIG. 3 is an embodiment of that conduit conducting the fluid from the upper closed section into the reaction section.

Referring now to FIG. 1, there is shown a carbon black reactor 1 which can be refractory lined in its reaction section 20 at walls 2. The upper section of the reactor is closed by head 3. Positioned below head 3 is suspended arch 5 which is of conventional refractory construction and which is supported by means of conventional refractory anchors 6 from support member 4. The inner surface of head 3 can be insulated to protect it. However, considerable heat is radiated to it from member 4 although arch 5 provides considerable insulation for member 4.

Entering the reactor through head 3 is hydrocarbon feed inlet conduit 7 which is discharged into the reactor through nozzle 8.

Member 4 is positioned within the reactor in any convenient manner which provides an adequate seal between its outer periphery and the inner periphery of the reactor wall. It can be a plate suspended from head 3, although in the present invention, it is more suitably a steel plate seal-welded around its outer periphery to the reactor shell. It forms upper section 9 between itself and head 3.

For the purpose of cooling both member 4 and head 3, a portion of the free oxygen-containing gas, which will be hereafter termed "air," without meaning to limit the invention thereto, which is used in the process, is introduced into that closed section 9 and into contact with the head and the support member. By so doing, their surfaces are cooled and the air is preheated. From section 9, the preheated air is then introduced into the reaction section 20 of the reactor.

By one means, air is introduced through conduit 11 and distributed throughout section 9 against the head and support by means of a suitably supported distribution ring or spider 13.

Referring now to FIG. 2, from section 9, the preheated air is caused to flow into conduit 14 through apertures 15 in the walls thereof and to discharge from conduit 14 into reaction section 20 through nozzle 8.

Preferably, conduit 14 is positioned concentrically to conduit 7 and discharges through nozzle 8 peripheral to the discharge of the hydrocarbon feed therefrom. However, discharge of the preheated air from nozzle 8 can be from a single aperture and in commingling relationship to the hydrocarbon feed as shown in FIG. 3. Advantageously, conduit 14 can be supported by welding to member 4. Nozzle 8 can be of any arrangement desired, it only being necessary that suitable means be provided for discharge of air from section 9 into the reaction section of the reactor.

A feasible design of the present invention is that in which distribution spider 13 is comprised of a series of rings of concentrically-positioned conduit, these rings discharging through a plurality of ports of small diameter onto the surface of member 4. This discharge of a large number of small streams acts to effectively cool the surface of member 4.

Relatedly, discharge from section 9 was made through two ports opening into conduit 14. These ports 16 were substantially semicircular in configuration as shown in FIG. 3 and were located in the uppermost portion of conduit 14 beneath head 3. In this manner, a maximum cooling of head 3 was effected and a minimum pressure drop was produced in conducting the preheated air into conduit 14.

In one application of the apparatus of this invention employing a 40 inch I.D. reactor, distribution spider 13 was comprised of three 2 inch conduits of circular configuration in concentric arrangement. These conduits were positioned on centerline radii of 17 inches, 12 inches, and 8 inches. The apertures were positioned in the walls of the conduit to discharge angularly downwardly, in the direction of the reactor wall and against the plate. All apertures were ⅛-inch in diameter, there being positioned in each conduit 50, 40, and 25 apertures, respectively, 4000 cubic feet per hour of air being discharged through the apertures. To minimize the outlet pressure drop, discharge was into a 3 inch conduit positioned peripherally to the oil inlet conduit. The 3 inch conduit was open at its top to provide an inlet area of about 5 square inches entrance area for the preheated air flowing thereinto. The 3 inch conduit was supported by welding to the plate from which the arch was suspended. Under this system of operation, the inner surface of the vessel head was maintained at less than 900° F. The distribution spider was positioned in that section formed by positioning the suspended arch and its support plate at a distance two inches below the weld of the dished head closure to the walls of the vessel. The support plate was affixed to the vessel around its periphery, with the distribution spider being affixed to support lugs which were affixed to the plate.

It will be evident from the foregoing that various modifications can be made to the method of this invention. Such, however, are considered as being within the scope of the invention.

What is claimed is:

1. A carbon black reactor comprising:
   a. a chamber closed at its one end by a closure member;
   b. a horizontally-positioned suspended refractory arch comprising a support member positioned within said chamber in spaced relationship from said closure member to form an upper closed section therebetween and a reaction section thereunder;
   c. first conduit means for introducing a fluid into said upper section, said conduit means comprising a plurality of rings of concentrically-positioned conduit, each of said rings being adapted with a multiplicity of apertures adapted to discharge into impinging relationship to said support member; and
   d. second conduit means comprising an inner conduit and an outer conduit forming an annulus therebetween, said inner conduit being terminally adapted with a nozzle, said outer conduit extending from said upper closed section with access means for passage of a fluid into said annulus, said second conduit means being adapted within said reaction section for passage of said fluid into contact with said nozzle.

2. The reactor of claim 1 in which said closure member is a curved head, and said arch is suspended from a support member onto which said first conduit discharges.

3. The reactor of claim 2 in which said refractory arch is a substantially flat arch constructed of refractory materials supported from said support member.

* * * * *